(12) United States Patent
Horiyama et al.

(10) Patent No.: US 7,852,502 B2
(45) Date of Patent: Dec. 14, 2010

(54) MANAGEMENT SYSTEM, IMAGE PROCESSING APPARATUS AND METHOD FOR ACQUIRING PRINT JOB HISTORY INFORMATION

(75) Inventors: Jun Horiyama, Kanagawa (JP); Koji Nozato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1157 days.

(21) Appl. No.: 10/405,222

(22) Filed: Apr. 3, 2003

(65) Prior Publication Data

US 2003/0195917 A1 Oct. 16, 2003

(30) Foreign Application Priority Data

Apr. 12, 2002 (JP) ............................. 2002-110687
Apr. 12, 2002 (JP) ............................. 2002-110688

(51) Int. Cl.
*G06F 3/12* (2006.01)
*G06F 15/173* (2006.01)

(52) U.S. Cl. .................... 358/1.15; 358/1.13; 358/1.14; 358/1.16; 358/1.18; 358/426.01; 709/223; 709/224; 709/225; 709/226; 709/232; 718/102; 718/103; 718/104

(58) Field of Classification Search ................. 709/203, 709/212, 217, 245, 219, 208, 232, 223, 202, 709/220, 224, 225, 209, 226, 249, 200, 109, 709/250; 358/1.1, 426.01, 1.11–1.18, 426.05, 358/1.6, 1.9, 403, 404, 406, 426.08, 426.11; 702/182, 188; 706/50; 718/102, 103, 104
See application file for complete search history.

(56) References Cited

U.S. PATENT DOCUMENTS

| | | | | |
|---|---|---|---|---|
| 4,802,094 A | * | 1/1989 | Nakamura et al. | 700/115 |
| 5,625,757 A | * | 4/1997 | Kageyama et al. | 358/1.14 |
| 5,819,047 A | * | 10/1998 | Bauer et al. | 709/229 |
| 6,202,092 B1 | | 3/2001 | Takimoto | 709/225 |
| 6,373,585 B1 | * | 4/2002 | Mastie et al. | 358/1.15 |
| 6,453,268 B1 | * | 9/2002 | Carney et al. | 702/186 |
| 6,650,433 B1 | * | 11/2003 | Keane et al. | 358/1.15 |
| 6,678,068 B1 | * | 1/2004 | Richter et al. | 358/1.15 |
| 6,814,510 B1 | * | 11/2004 | Sabbagh et al. | 400/63 |
| 6,874,034 B1 | * | 3/2005 | Hertling | 709/245 |
| 2001/0054088 A1 | | 12/2001 | Naito et al. | 709/219 |
| 2002/0138557 A1 | * | 9/2002 | Mukaiyama et al. | 709/203 |

FOREIGN PATENT DOCUMENTS

JP 10-161823 6/1998

* cited by examiner

*Primary Examiner*—Edward L Coles
*Assistant Examiner*—Steven Kau
(74) *Attorney, Agent, or Firm*—Fitzpatrick, Cella, Harper & Scinto

(57) ABSTRACT

The present invention makes it possible to uniquely manage the use of peripherals over a wide range or in two or more bases. The present invention controls whether all job information, managed by a management apparatus, is acquired from the management apparatus managing information on data processing, performed by a device, as job information, or additional job information among job information managed by the management apparatus is acquired.

8 Claims, 15 Drawing Sheets

FIG. 7

| JobId | 520 |
|---|---|
| APPLICATION NAME | WORD MEIJIN (EXPERT) |
| NUMBER OF LOGICAL PAGES | 9 |
| DOCUMENT NAME | abcd0001 |
| ORIGINAL DOCUMENT NAME | ANNUAL REPORT IN FISCAL YEAR 2001 |
| PROCESSED | NO |
| TYPE | HOOK |
| START TIME | 2001/12/20 21:11 |
| END TIME | 2001/12/20 21:21 |

FIG. 8

| JobId | 520 |
|---|---|
| PAPER SIZE | A4 |
| N-up | 4 |
| NUMBER OF PHYSICAL PAGES | 3 |
| DUPLEX/SIMPLEX | DUPLEX |
| PROCESSED | NO |
| TYPE | DRIVER |
| START TIME | 2001/12/20 21:21 |
| END TIME | 2001/12/20 21:31 |

FIG. 9

| JobId | 520 |
|---|---|
| OWNER'S NAME | YAMADA |
| SPOOL DATA SIZE | 56789 |
| NUMBER OF PHYSICAL PAGES | 3 |
| DUPLEX/SIMPLEX | DUPLEX |
| PROCESSED | NO |
| TYPE | API |
| START TIME | 2001/12/20 21:31 |
| END TIME | 2001/12/20 21:41 |

FIG. 10

| JobId | 520 |
|---|---|
| PROCESSED | NO |
| TYPE | TRANSMISSION MODULE |
| START TIME | 2001/12/20 21:41 |
| END TIME | 2001/12/20 21:51 |

FIG. 11

| JobId | 520 |
|---|---|
| APPLICATION NAME | WORD MEIJIN (EXPERT) |
| NUMBER OF LOGICAL PAGES | 9 |
| DOCUMENT NAME | abcd0001 |
| ORIGINAL DOCUMENT NAME | ANNUAL REPORT IN FISCAL YEAR 2001 |
| PROCESSED | NO |
| TYPE | MERGING |
| START TIME | 2001/12/20 21:11 |
| END TIME | 2001/12/20 21:21 |
| PAPER SIZE | A4 |
| N-up | 4 |
| NUMBER OF PHYSICAL PAGES | 3 |
| DUPLEX/SIMPLEX | DUPLEX |
| OWNER'S NAME | YAMADA |
| SPOOL DATA SIZE | 56789 |

FIG. 12

| JobId | 520 |
|---|---|
| NUMBER OF DELIVERY PAGES | 3 |
| NUMBER OF DELIVERY SHEETS | 2 |
| PROCESSED | NO |
| TYPE | TRANSMISSION MODULE |
| START TIME | 2001/12/20 22:01 |
| END TIME | 2001/12/20 22:11 |
| DOCUMENT NAME | abcd0001 |
| DEVICE NAME | XYZ |

FIG. 13

| JobId | 520 |
|---|---|
| APPLICATION NAME | WORD MEIJIN (EXPERT) |
| NUMBER OF LOGICAL PAGES | 9 |
| DOCUMENT NAME | ANNUAL REPORT IN FISCAL YEAR 2001 |
| PROCESSED | NO |
| TYPE | MERGING |
| START TIME | 2001/12/20 21:11 |
| END TIME | 2001/12/20 21:21 |
| PAPER SIZE | A4 |
| N-up | 4 |
| NUMBER OF PHYSICAL PAGES | 3 |
| DUPLEX/SIMPLEX | DUPLEX |
| OWNER'S NAME | YAMADA |
| SPOOL DATA SIZE | 56789 |
| NUMBER OF DELIVERY PAGES | 3 |
| NUMBER OF DELIVERY SHEETS | 2 |
| DEVICE NAME | XYZ |

MANAGEMENT SYSTEM, IMAGE PROCESSING APPARATUS AND METHOD FOR ACQUIRING PRINT JOB HISTORY INFORMATION

BACKGROUND OF THE INVENTION

1. Field of the Invention

The present invention relates to a management system of a usage amount at the time when a user uses a peripheral, which is connected to a network, such as a printer, a scanner, a copier, or a multi function peripheral (MFP) that integrate them, in a network environment constituted of a client computer, a server computer, etc.

2. Related Background Art

Up to now, known information processing apparatuses have managed usage amounts or information, relating to data processing executed by use, when each user uses a peripheral such as a printer, a scanner, a copier, or a multi function peripheral (MFP) integrating them, via a network.

In such an information processing apparatus, for example, as disclosed in Japanese Patent Application Laid-Open No. 10-161823 (U.S. Pat. No. 6,202,092), one server computer manages the use of a peripheral.

SUMMARY OF THE INVENTION

Nevertheless, in conventional technology as in the above, one server computer should manage plenty of peripherals when there are a lot of peripherals. In addition, in this case, peripherals that one server computer can manage are limited to ones that exist in the same building or room, or the like.

Hence, it was difficult to integrally manage a use status of peripherals in a wide range or across two or more bases by using a communication path such as the Internet. In addition, even if a plurality of server computers were installed in each base, the plurality of server computers managed only usage amounts and use statuses of peripherals under management, and information collected by each server computer was utilized individually and independently.

Hence, the present invention is to solve the tasks of conventional technology described above, and aims at making it possible to centrally manage the use of peripherals in a wide range or across a plurality of bases.

Moreover, the present invention aims at efficiently collecting information collected in a wide range or across a plurality of bases without increasing a load.

In addition, when a new user or apparatus, or the like is added in each base, a mismatch is caused between information, having already been grasped, and information collected from each base, and hence, it is not possible to correctly manage states of peripherals. On the other hand, it becomes impossible to perform accurate management in the case of unconditionally discarding the information where the mismatch is caused in order to avoid it, and a communication load and a processing load increase in the case of acquiring all the past information every time.

Hence, the present invention is to solve the tasks of conventional technology described above, and aims at making it possible to centrally manage the use of peripherals in a wide range or across a plurality of bases.

Moreover, the present invention aims at making it possible to perform information management corresponding to user's intention by also flexibly corresponding to the case that a new user or apparatus, or the like is added.

BRIEF DESCRIPTION OF THE DRAWINGS

FIG. 7 is a table showing an example of a hook log;

FIG. 8 is a table showing an example of a driver log;

FIG. 9 is a table showing an example of an API log;

FIG. 10 is a table showing an example of a transmission unit log;

FIG. 11 is a table showing an example of a merge log generated by merge processing;

FIG. 12 is a table showing an example of a device log;

FIG. 13 is a table showing an example of a final log that a job log-merging unit 123 generates;

DETAILED DESCRIPTION OF THE PREFERRED EMBODIMENTS

Hereafter, an example of embodiments of the present invention will be explained with referring to drawings.

Figure 1:
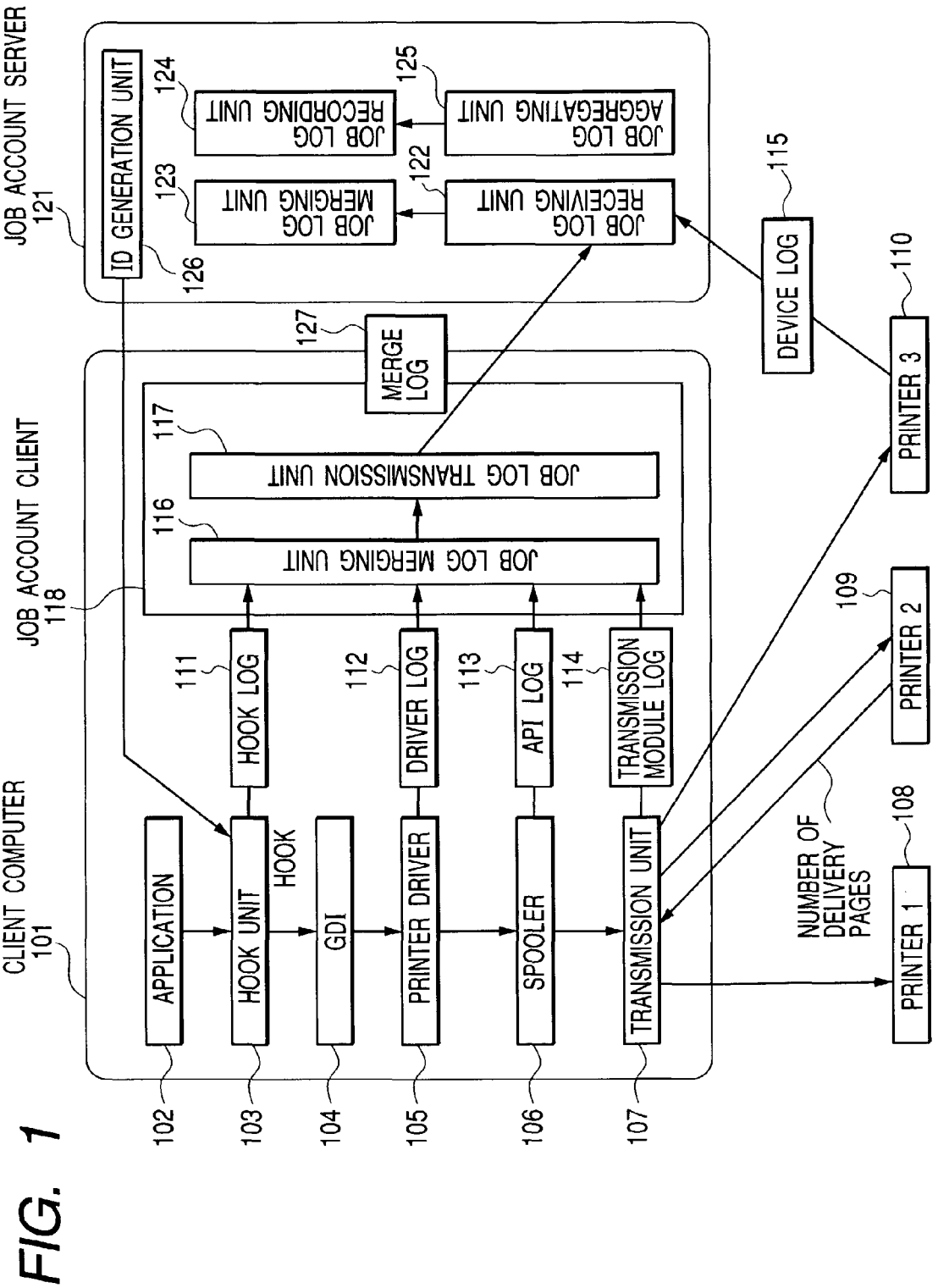
FIG. 1 is a diagram showing an example of a system that becomes a prerequisite of an embodiment of a job account system.

FIG. 1 is a diagram showing an example of a system that becomes a prerequisite of an embodiment of a job account system. Printers 108 to 110 that are preferable examples of an image forming apparatus of the present invention that are construction members in FIG. 1 will be described.

Printers differently operate according to their functions. For example, the printer 108 is a most general one, and prints data received from a transmission unit in a client computer. In addition, the data processing that a device is required to perform is called a job, and in particular, the printing processing based on print data is called a printing job. The printer 109 sends a total number of delivery pages of the job at the time of job end to the transmission unit in the client computer 101. After printing, the printer 110 stores job information in memory in the printer.

The client computer 101 in FIG. 1 performs printing as follows. An application 102 operates a GDI (a subsystem processing graphic drawing) 104 of an OS by calling an application programming interface (API). A printer driver 105 converts a request from the GDI 104 into a form suitable to a printer performing printing to transmit the request to a spooler 106.

In the client computer 101, a job account client 118 hooks (monitors and recognizes) a GDI call of the application 102. The job account client 118 acquires a number of delivery sheets or a number of pages of a job that the application issued by counting the API performing page breaks or paper ejections. The job information acquired owing to this is called a hook log.

In addition, the job account client 118 can receive job information from a printer driver in the client computer by beforehand defining a protocol with and communicating with the printer driver. The job information acquired owing to this is called a driver log.

Furthermore, the job account client 118 acquires a number of delivery sheets or a number of pages of a job by monitoring a spooler periodically, and acquiring job information in the API when there is the job to be spooled. The job information acquired owing to this is called an API log.

Furthermore, the job account client 118 acquires a total number of delivery pages, which the printer returns, by defining a protocol with and communicating with the transmission unit. The job information acquired owing to this is called a transmission unit log.

Moreover, the job account server acquires job information from a printer by defining a protocol with and communicating with a printer in the case of the printer, storing the job information in the printer, such as a printer 110 that is a preferable example of the image forming apparatus. The job information acquired owing to this is called a device log. Though the device log is stored in RAM or an HDD in the printer, due to the limitation of memory capacity, it frequently happens that it is not possible to store all of the information such as a document name transmitted from the transmission unit. In addition, the image forming apparatus includes a facsimile, a copier, or a copying system combining a printer, which is a kind of copier and a scanner in addition to being a printer.

The job account client 118 provides the priority of which is to be selected from among the hook log, driver log, API log, transmission unit log, and device log, and transmits any one to the job account server.

A job account server 121 selects a job log according to a reading requester's request to perform aggregate processing such as aggregation by unit time, by device, and by job issuer.

FIG. 1 will be explained in further detail.

The client computer 101 composed of a standard PC or a work station transmits print data to either of the printers 108, 109, and 110 through the transmission unit 107 when printing is instructed from the application 102. The job account client 118 that is a software unit executed by a CPU in the client computer collects logs concerning various types of printing processing to transmit them to the job account server 121 through a job log transmission unit 117. At this time, the job log transmission unit that is a part of the job account client can also transmit the logs to a job log receiving unit by controlling a transmission part that the OS provides.

When a printing instruction is issued to the application 102 in the client computer 101, the application 102 calls the GDI for drawing. A hook unit 103 is built in by the job account client 118, and stores information such as which GDI call is called by any parameter, and a called frequency by hooking the GDI calls. The history established on the basis of this information is called a hook log 111.

An example of the hook log 111 is shown in FIG. 7. The hook unit 103 may change a document name on the basis of a specific criterion according to circumstances. The document name and this modification processing will be described later.

The printer driver 105 converts the GDI call into print data that the printer can interpret according to print settings to transmit the print data to the spooler 106, and extracts printed information from the contents of the conversion to transmit the printed information to the job account client 118 as a driver log 112.

The job account client 118 monitors whether a job stays in the spooler 106. If a job stays, the job account client 118 issues an API specified by the OS to acquire the printed information, and acquires the printed information as an API log 113.

The transmission unit 107 communicates with the printer designated among the printers 108, 109, and 110 from the application via a network to transmit print data if the printer is in a ready state. At this time, for instance, if a command in Printer Job Language of Hewlett-Packard Company that is described above is used, it is possible to acquire a number of pages that the job concerned delivered in the printer 109 after completing the delivery of all the pages of the printing job. A transmission unit (port monitor) 107 sends the job information such as the number of pages received from the printer 109 to the job account client 118. The printing log created on the basis of this information is called a transmission unit log 114.

In this manner, in the job account client (acquisition means) 118, four logs, that is, the hook log, driver log, API log, and transmission unit log are acquired, and created for one printing job. Nevertheless, four logs can not be necessarily taken at any time. For example, if the application 102 sends print data directly to the spooler 106, it is not possible to acquire the hook log 111 and driver log 112. If a protocol is not specified between the printer driver 105 and job account client 118, it is not possible to acquire the driver log 112. If there is no function of notifying the transmission unit of a number of delivery pages like the printer 109, it is not possible to acquire delivery page information in the transmission unit log 114. Nevertheless, by acquiring logs in a plurality of processing relating to the job, a probability of being able to acquire the log rises totally even if log acquisition is impossible in a part of processing.

The printer 108 interprets the job sent from the transmission unit 107, and executes printing. The printer 109 interprets the job sent from the transmission unit 107, and executes printing. After the end of the printing, the number of delivery pages and the number of delivery sheets are replied to the transmission unit 107. The printer 110 interprets the job sent from the transmission unit 107, and executes printing. After of the end of the printing, the job information is stored in an HDD (described later) 304.

A job log merging unit 116 merges the hook log, driver log, API log, and transmission unit log to send its result to the job log transmission unit 117. Merge processing will be described later. The job log transmission unit 117 transmits a job log to a job log receiving unit 122 of the job account server 121.

Figure 2:
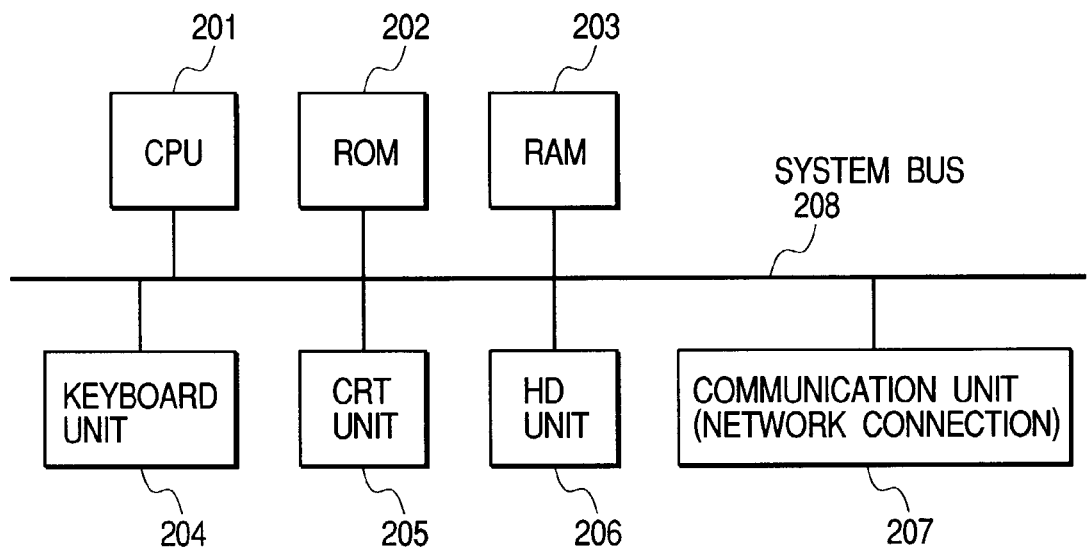
FIG. 2 is a block diagram showing an example of the construction of a client computer and a server computer.

FIG. 2 is a block diagram showing an example of the construction of a client computer and a server computer constituting the job account system shown in FIG. 1. In FIG. 2, a CPU 201 is a central processing unit, and performs the control of this entire computer apparatus, arithmetic processing, etc. ROM 202 is read only memory, and is a storage area of information of the system boot program. RAM 203 is random-access memory, and is a data storage area without limitation of use, the RAM 203 which is an area where software units, that is, the operating system, application 102, hook unit 103, GDI 104, printer driver 105, transmission unit 107, and job account client 118, and, a program for communication control etc. are loaded from the HD unit 206 and ROM 202, and are executed by the CPU 201. A KBC 204 is a keyboard control unit, and receives input data from a keyboard to transmit the input data to the CPU. A CRT 205 is a display control unit (display control means), and controls display in a display apparatus. An external storage apparatus 206 is an FD, which is a floppy (R) disk drive, an HD, which is a hard disk drive, or SRAM, which is nonvolatile storage, and stores a program and data that are referred to or loaded to the RAM if necessary at an execution time. A communication unit 207 controls network communication, and can communicate with another computer and a peripheral, which are connected to a network as explained in FIG. 1, and is controlled by the transmission unit 107 and job log transmission unit 117. A system bus 208 becomes a data path between the above-described components.

Figure 3:
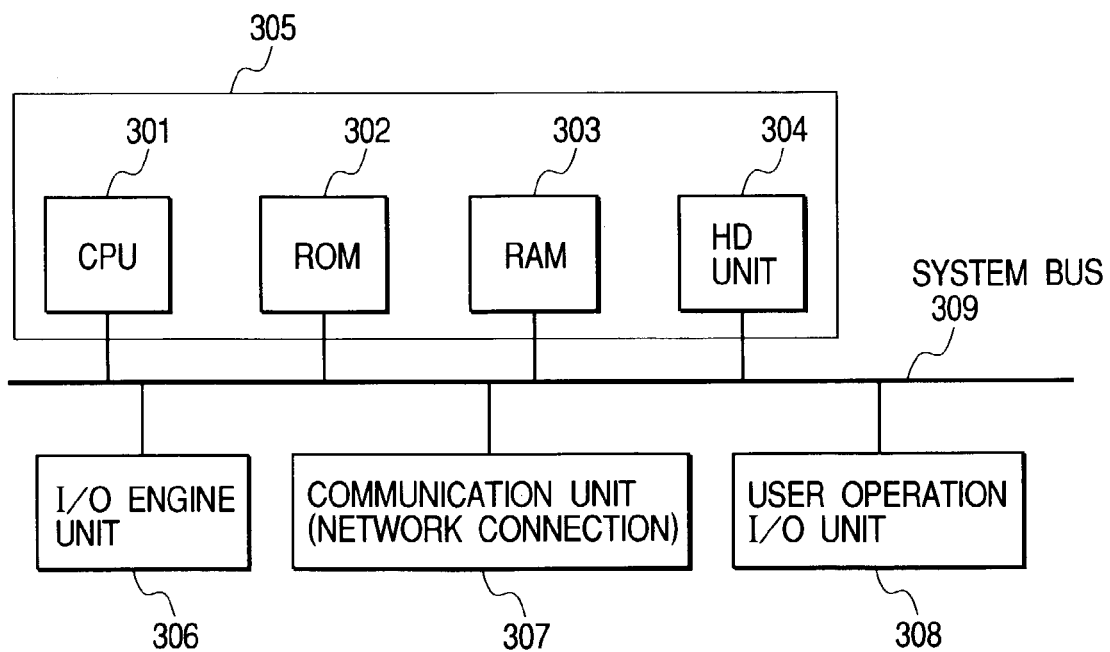
FIG. 3 is a block diagram showing an example of the construction of a printer.

FIG. 3 is a block diagram showing an example of construction of a printer constituting the job account system shown in FIG. 1. In FIG. 3, a controller unit 305 controls the entire printer. A CPU 301 is a central processing unit constituting the controller, and performs the control of this controller, arithmetic processing, etc. ROM 302 is read only memory, and is a storage area of information etc. of the system boot program. RAM 303 is random-access memory, and is a data storage area without limitation of use, and nonvolatile storage 304 is a HD, which is a hard disk, SRAM, or the like.

The RAM 303 is an area where the operating system, and programs for communication control, engine controller, etc. are loaded and executed. An engine unit 306 of this apparatus performs printing operation and image reading under the control of the controller. A communication unit 307 controls network communication, and can communicate with the client computer and server computer as explained in FIG. 1. A user operation I/O unit 308 performs interactive setting work with a user. A system bus 309 becomes a data path between the above-described components.

Figure 4:
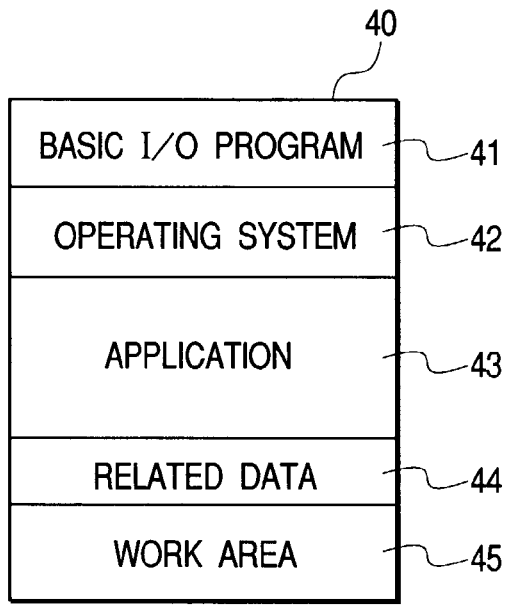
FIG. 4 is a map showing an example of a memory map of a job account server 121.

FIG. 4 is a map showing an example of a memory map of the job account server 121 shown in FIG. 1. Reference numeral 41 denotes a basic I/O program. Reference numeral 42 denotes a part of the memory map where the operating system like a window system etc. is loaded into the RAM 203 and becomes executable. Reference numeral 43 denotes a memory map in a state where a program of the present invention is loaded into the RAM 203 and became executable. Reference numeral 44 is a memory map in a state where related data is loaded into the RAM 203 and becomes executable. Reference numeral 45 shows a memory map of the work memory that each program uses.

Figure 5:
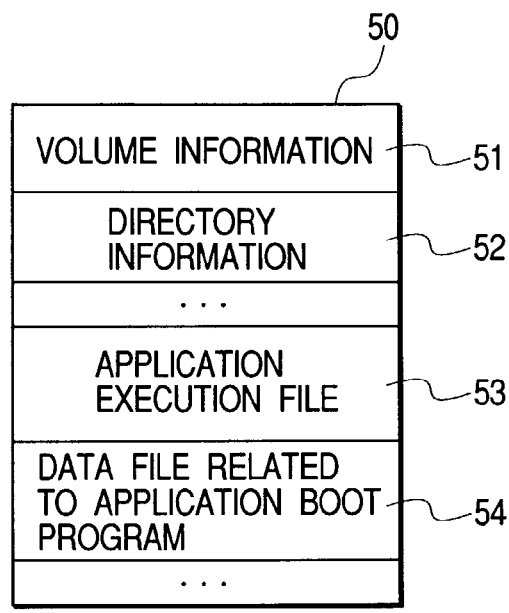
FIG. 5 is a map showing constituent contents of the construction of an FD to which a job account program and related data are loaded.

FIG. 5 is a map showing constituent contents of the construction of an FD to which the job account program and related data that are examples of an embodiment of the present invention are loaded. The job account program and related data that are examples of an embodiment of the present invention are recorded in a floppy (R) disk (FD). Volume information 51, directory information 52, an application execution file 53, and a data file 54 related to the job account program are recorded in a recording area 50 of the floppy (R) disk (FD). In addition, it is needless to say that the recording area 50 can be a DVD or an HDD (not shown) in an external server apparatus network-connected to a computer 62, and the job account program of the present invention (each unit in the client computer and each unit in the job account server 121 that are shown in FIG. 1) can be also implemented by being downloaded via the network. The computer 62 is equivalent to the computer shown in FIG. 2.

Figure 6:
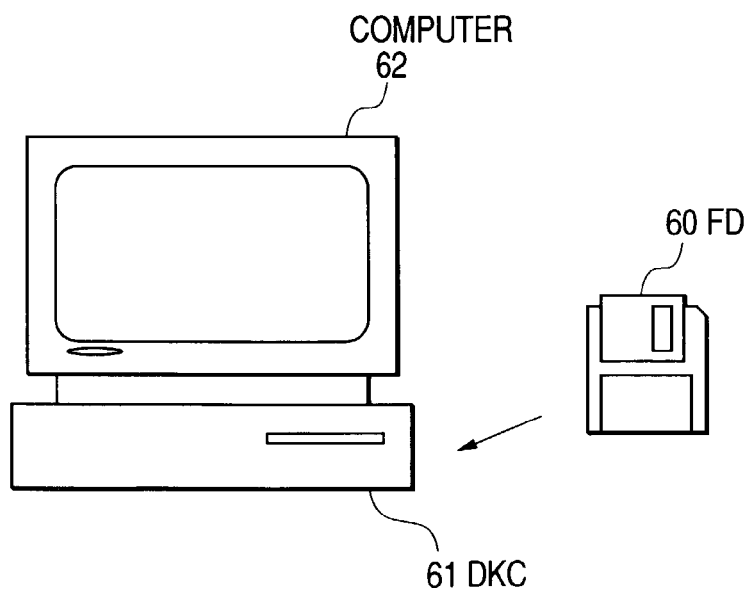
FIG. 6 is a schematic diagram showing an example of loading a job account program and related data, which are recorded in an FD, into a computer system.

FIG. 6 is a schematic diagram showing an example of loading a job account program and related data, which are examples of an embodiment of the present invention and are recorded in an FD, into a computer system. It is possible to load the job account program and related data, which are recorded in the floppy (R) disk (FD) 60, through an FD drive (DKC) 61 into the computer 62. When the floppy (R) disk (FD) 60 is set in the FD drive (DKC) 61, program units and related data for achieving this job account program are read from the floppy (R) disk (FD) 60 and are loaded into the RAM 203, under the control of the operating system 42 and basic I/O program 41, and become available. The computer 62 can be used to achieve the client computer 101 and job account server 121 that are described in FIG. 1. In addition, the "program unit etc. for achieving the job account program" correspond to each software unit in the client computer 101 or in the job account server 121 that are shown in FIG. 1. Of course, it is needless to say that a storage medium is not limited to the FD, but includes a DVD, a CD-ROM, or the like.

FIG. 7 is a table showing an example of a hook log in an embodiment of the present invention. In the hook log, it is possible to acquire a job ID (job identifier), an application name, a number of logical pages, and a document name. The job ID is acquired from the GDI when printing start is instructed to the GDI, and can uniquely designate a printing job in the client computer 101.

FIG. 8 is a table showing an example of a driver log in this embodiment. The driver log is historical information that the job account client can acquire from the driver at a printing execution time. It is possible to acquire a job ID that is an identifier of a job relating to print execution, paper size of print data, N-UP information, information on a number of physical pages, and duplex/simplex information that the job includes, from the driver log. The paper size, N-UP information, number of physical pages and duplex/simplex information are acquired from the print setting that is set in the printer driver at printing or by a default input. N-UP is the setting of how many logical pages are allocated in a form. The number of physical pages has the unit that a simplex of a form outputted at printing is counted as one.

For example, when 2-UP printing processing is performed in duplex printing at the time of four logical pages, physical pages become 2. Then, the physical pages are printed on both sides of the form, and one sheet of form is ejected. A first logical page and a second logical page are printed on a top, and a third logical page and a fourth logical page are printed on a back.

FIG. 9 is a table showing an example of the API log in this embodiment. In the API log, it is possible to acquire a job ID, an owner's name, and spool data size.

FIG. 10 is a table showing an example of the transmission unit log in an embodiment of the present invention. In the monitor log, it is possible to acquire a job ID. When transmission is performed to the printer 108, it is possible to acquire a number of delivery sheets etc. in addition to this.

In each of the hook log, driver log, API log, and transmission unit log, an area where flag information showing whether the job concerned ends the processing and information showing a log type are recorded is provided.

Here, the operation of the job log merging unit 116 in the client computer will be explained. The job log merging unit 116 receives each log, and records its contents in an HDD etc.

Then, the job log merging unit 116 starts periodically in a predetermined period, and performs the merge processing of logs per job.

Though logs are merged-in this embodiment by making a job ID a key, it is also good to merge logs by making a document data name, which will be described later, or a new document data name a key.

FIG. 11 is a table showing an example of a merge log generated by merge processing. This merge log provides items of a hook log, a driver log, an API log, and a transmission unit log as shown in the table.

Next, the operation of the job account server 121 will be explained. A job log receiving unit 122 that is a preferable example of acquisition means of the present invention acquires and stores a job sent from the job log transmission unit 117. In addition, the job log receiving unit 122 performs the polling of the printer-3 110 periodically, and acquires job information if there is job information not acquired yet. This job information is made a device log. Though the device log is stored in the RAM 303 or HDD 304, it is not desirable to store all the information such as a document name, transmitted from the transmission unit 107, because of the limitation of memory capacity. Here, it is assumed that the upper limit of the document name is eight characters. FIG. 12 is a table showing an example of the device log.

A device job log merging unit 123 that is a preferable example of managing means of the present invention merges a merge log 127, sent from the job account client, and the device log 115. A job log recording unit 124 receives the job log from the job log merging unit 123 and stores it in the HD 206 etc. A job log aggregating unit 125 performs aggregate processing such as finding of a number of printed pages per unit period, or a number of printed pages per owner by a reader's command.

The job log merging unit 123 retrieves and determines whether there is an unprocessed device log where an item of the document name is the same as that of the merge log, and substitutes or adds the number of delivery pages and number of delivery sheets in the device log for/to those in the merge log if it is determined to be present.

FIG. 13 is a table showing an example of a final log that the job log merging unit 123 generates. The job log merging unit 123 transmits the final log to a job log recording unit 124.

Figure 14:
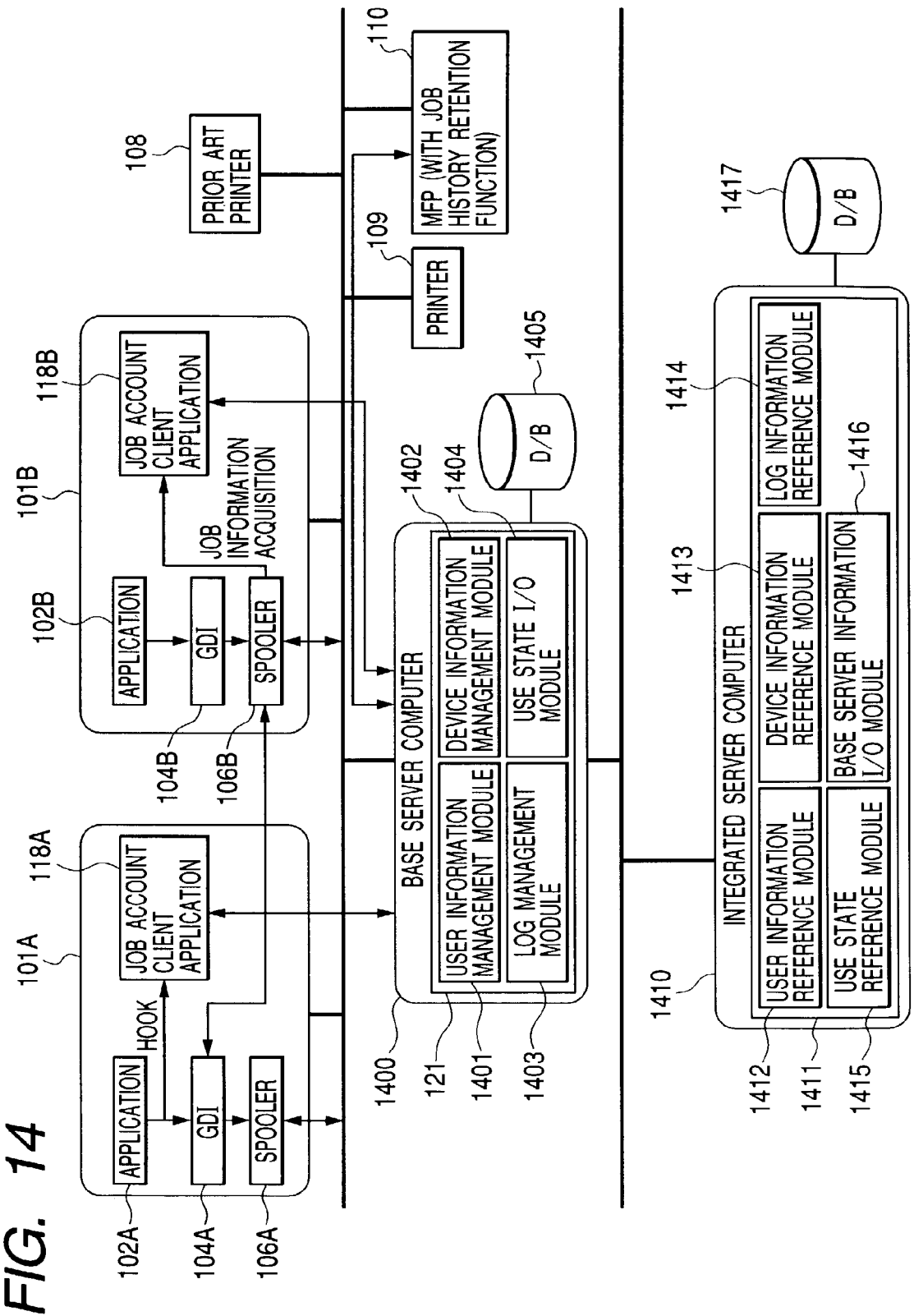
FIG. 14 is a basic structural diagram of an entire management system.

FIG. 14 is a basic structural diagram of an entire management system as this embodiment. Reference numerals 101A and 101B denote client computers. Reference numeral 1400 denotes a base server computer. Reference numeral 1410 denotes an integrated server computer.

Reference numerals 108 to 110 denote printers. Nevertheless, it is assumed that the printer 110 is a multi function periphery (MFP) that has a function (printing history retaining function) of retaining printing history, and printers 108 and 109 do not have the printing history retaining function. The MFP 110 comprises a printer function, a copy function, a scanner function, and the printing history retaining function.

The computers 101A, 101B, 1400, and 1410, and the printers 109 and 108, and MFP 110 can respectively communicate with other apparatuses via a network.

In the client computer 101A, when the application 102A calls the GDI (Graphics Device Interface) 104A, the GDI 104A generates print data according to a command from the application 102A to transmit print data to the spooler 106A.

The job account client application 118A monitors (hooks) the application 102A calling the GDI 104A to store a hook log relating to the print data.

The spooler 106A communicates with a peripheral via the network, and if the peripheral is ready, the print data is transmitted. In addition, when the client computer 101B functions as a printer server, the print data that the GDI 104A generated is transmitted to the spooler 106B.

The job account client application 118A transmits the merge log, periodically stored, to the job account server application 121.

In the client computer 101B, the application 102B, GDI 104B, and spooler 106B operate similarly to the application 101A, GDI 104A, and spooler 106A, respectively.

A job account client application 118B monitors the spooler 106B periodically. If there is a printing job spooled in the spooler 106B, the job account client application 118B acquires information on the printing job by using an API (Application Program Interface). Specifically, the job account client application 118B acquires a number of delivery sheets and a number of pages of the printing job. Then, the job account client application 118B transmits the merge log, periodically stored, to the job account server application 121.

If the O/S comprises a function of sending a status change of the spooler 106B to another application, it is acceptable that the job account client application 118B does not monitor the spooler 106B periodically. The OS only has to send to the job account client application 118B that the printing job is spooled in the spooler 106B.

In addition, reference numerals 102A and 102B are equal to reference numeral 102 in FIG. 1, reference numerals 104A and 104B are equal to reference numeral 104 in FIG. 1, reference numerals 106A and 106B are equal to reference numeral 106 in FIG. 1, and reference numerals 118A and 118B are equal to reference numeral 118 in FIG. 1.

In the server computer 1400, the job account server application 121 includes a user information management unit 1401, a device information management unit 1402, a log management unit 1403, and a use state I/O unit 1404. Among these, the user information management unit 1401 stores and manages user information in memory storage 1405, not shown, in server computer 1400.

Furthermore, the device information management unit 1402 investigates whether a peripheral connected to the network has a device log retaining function, and stores information on a device, having the device log retaining function, and other device information in the memory storage 1405 in the server computer 1400 and manages them.

The user information includes a computer log-in name (a name inputted so that a user may log in the computer) and a network log-in name (a name inputted so that the user may log in the network system) of the user using a peripheral, and is information for specifying (identifying) the user using the peripheral. In addition, the device information includes printing speed, color information, a network address, etc. of the peripheral.

The log management unit 1403 receives the merge log 127 from the job account client applications 118A and 118B, and also stores the merge log in the memory storage 1405. In addition, the log management unit 1403 requests a device log to a peripheral (for example, the printer 110) having a function of retaining the device log 115, and acquires the device log through the use state I/O unit 1404. This processing may be periodically performed. Furthermore, it is also acceptable that, when the memory capacity of a device log storage unit (not shown) of a peripheral decreases, it is reported to the use state I/O unit, and at that time, this processing is performed.

Furthermore, it is also acceptable that, when the memory capacity of a device log storage unit (not shown) of a peripheral decreases, it is reported to the use state I/O unit, and at that time, this processing is performed.

The use state I/O unit 1404 acquires a use state including a device log from a peripheral having a device log retaining function. In addition, the use state I/O unit 1404 can also output a use state report (a report showing how many jobs were executed per user) to a printer and/or a monitor of a peripheral.

A supervisor can make the use state I/O unit 1404 output a use state to acquire a use state of the peripheral. The use state I/O unit 1404 outputs various use states on the basis of user information, device information, and historical print information (job information formed by summarizing a plurality of final logs in FIG. 13) which are stored in the memory storage 1405. The supervisor designates an output form (output format) for them to the use state I/O unit. In addition, this use state output is displayed in, for example, a display unit (not shown) of the server computer 1400. Furthermore, output data relating to the use state output may be transmitted to the client computer 101A or 101B, and may be displayed in a display unit (not shown) of the client computer.

The use state output outputs a usage amount (a number of sheets of forms and an amount of toner used for outputs) and the used time of a peripheral per user. In addition, a use state is separately outputted per operation mode (function) of a peripheral such as color printing or duplex printing. Furthermore, a use state is outputted per size or paper type used.

Moreover, a usage charge per peripheral or per user is outputted when a usage rate of the peripheral is set in the device information. In addition, the use state output outputs a paper type, an operation mode, a peripheral name, a printing amount, and a usage charge per user when usage rates per operation mode, per paper size, and per paper type are set.

Furthermore, a supervisor can also set use limitation per function, per user, per user department, and per used device through the user information management unit 1401 and device information management unit 1402. There are items such as a usage rate, a number of pages, and a number of sheets of paper as the limited information that can be set. When a user exceeds the use limitation, the use state I/O unit 1404 outputs so by monitoring the historical print information and collating the historical print information with the set limitation (limitation information). It is no problem whether this is a display output on a screen or a communication output such as e-mail.

In addition, when a certain user's use exceeds the limitation, the log management unit 1403 makes the client computer 101A or the peripheral itself refuse the user's use by monitoring the historical print information and collating the historical print information with the limitation set per user. Alternatively, it is also acceptable to sound an alarm by the display on a screen or by other communication means such as e-mail to the user.

The integrated server computer 1410 and base server computer 1400 can communicate with each other via a network such as a LAN or the Internet. In addition, it is no problem whether a number of the base server computers 1400 that communicate with one integrated server computer is single or plural.

In the integrated server computer 1410, the job account integration server application 1411 includes a user information reference unit 1412, a device information reference unit 1413, a log reference unit 1414, a use state reference unit 1415, and a base server information I/O unit 1416.

Among these, the user information reference unit 1412 can refer to user information, stored in the memory storage 1417, with the base server information I/O unit 1416.

In addition, it is needless to say that it is no problem whether the memory storage 1417 is installed in the integrated server computer 1410 and is managed or is installed in another computer, which can communicate with the integrated server computer 1410, and is managed.

Furthermore, the device information reference unit 1413 can refer to device information, stored in the memory storage 1417, with the base server information I/O unit 1416.

The log reference unit 1414 can refer to historical print information, stored in the memory storage 1417, with the base server information I/O unit 1416.

The use state reference unit 1415 can refer to information on a device use state that is stored in the memory storage 1417.

The base server information I/O unit 1416 acquires the user information, device information, and historical print information from the base server computer 1400. In addition, the base server information I/O unit 1416 can also output a use state report of the base server computer 1400 (a report showing how many jobs were executed per user per base server computer 1400) to a printer and/or a monitor of a peripheral.

A supervisor can make the base server information I/O unit 1416 output a use state to acquire a use state of the peripheral. The base server information I/O unit 1416 outputs various use states on the basis of base server information, user information, device information, and historical print information that are stored in the memory storage 1417.

The supervisor designates an output form (output format) for them to the base server information I/O unit 1416. In addition, this use state output is displayed in, for example, a display unit (not shown) of the integrated server computer 1410. Furthermore, output data relating to the use state output may be transmitted to the client computer 101A, and may be displayed in a display unit (not shown) of the client computer.

The use state output outputs a usage amount (a number of sheets of forms and an amount of toner used for outputs) and the used time of a peripheral per user registered in each base server computer 1400. Moreover, a use state is separately outputted per operation mode (function) of a peripheral such as color printing or duplex printing. In addition, a use state is outputted per size or paper type used.

Furthermore, a usage charge per peripheral or per user is outputted when a usage rate of the peripheral is set in the device information. Moreover, the use state output outputs a paper type, an operation mode, a peripheral name, a printing amount, and a usage charge per user when usage rates per operation mode, per paper size, and per paper type are set.

Figure 15:
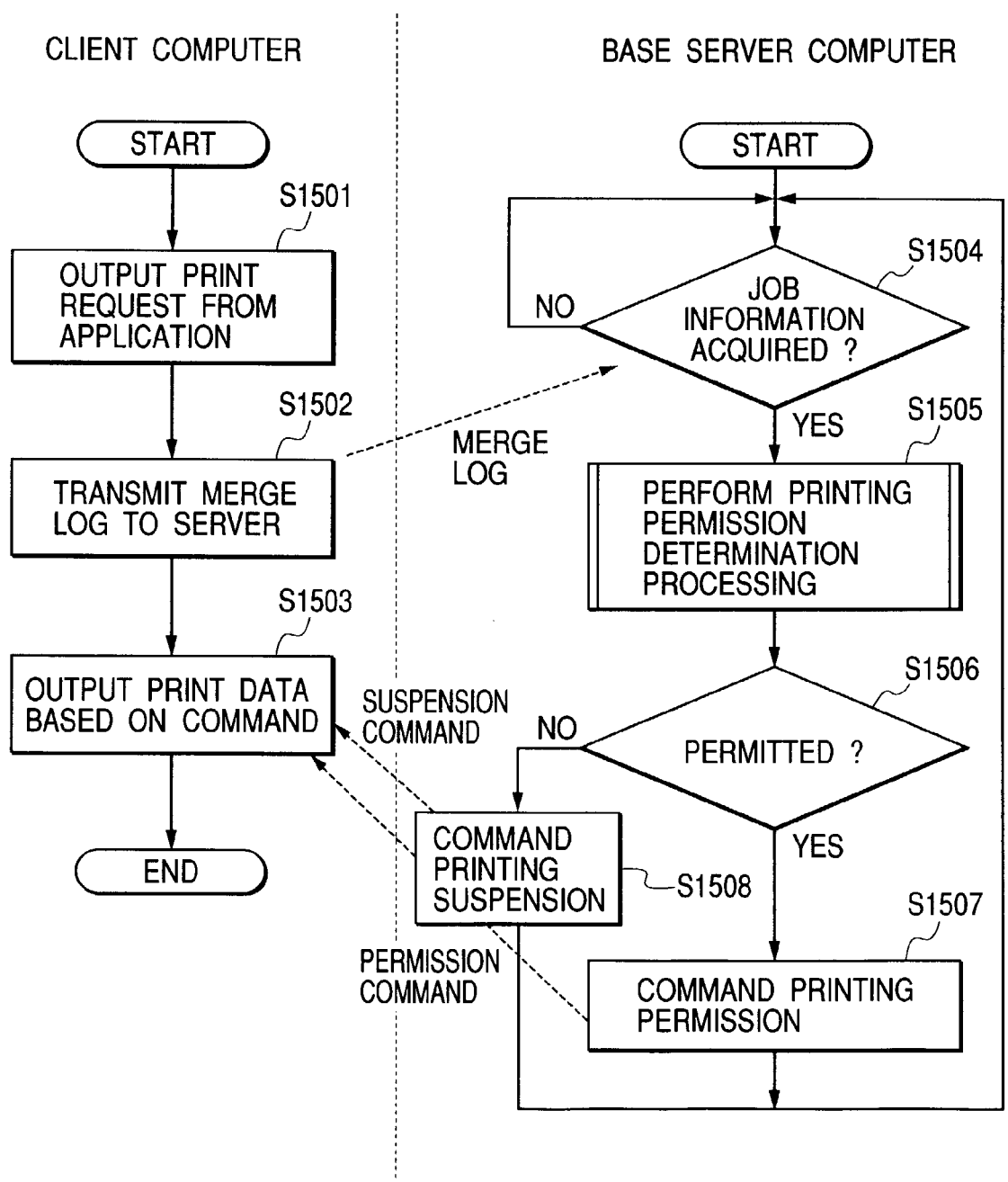
FIG. 15 is a flow chart explaining a flow of processing performed in a client computer 101 (101A and 101B) and a base server computer 1400.

FIG. 15 is a flow chart explaining a flow of processing performed in the client computer 101 (101A and 101B) and base server computer 1400.

First of all, at step S1501, when a user instructs printing in the application 102 in the client computer 101, the application 102 edits a document, an image, etc. and outputs a print request according to the user's instruction.

Next, at step S1502, the job account client application 118 acquires a hook log, a driver log, an API log, and a transmission unit log, and generates a merge log from them to transmit the merge log to a base server computer.

Subsequently, at step S1503, print data is output to a printer 110 through the spooler 106 on the basis of an instruction from the job account server application.

On the other hand, in the base server computer 1400, when the log management unit 1403 acquires the merge log at step S1504, the process proceeds to step S1505, and the determination processing of printing permission is performed.

Next, the process proceeds to step S1507 when the base server computer 1400 permits the printing at step S1506, and the base server computer 1400 instructs the printing permission. If the base server computer 1400 does not permit the printing, the process proceeds to step S1508, and the base server computer 1400 transmits an instruction of printing suspension to the printer or client computer.

Subsequently, the processing at the time when the integrated server computer 1410 acquires various types of information from the base server computer 1400 will be explained by using FIGS. 17 and 18.

Figure 16:
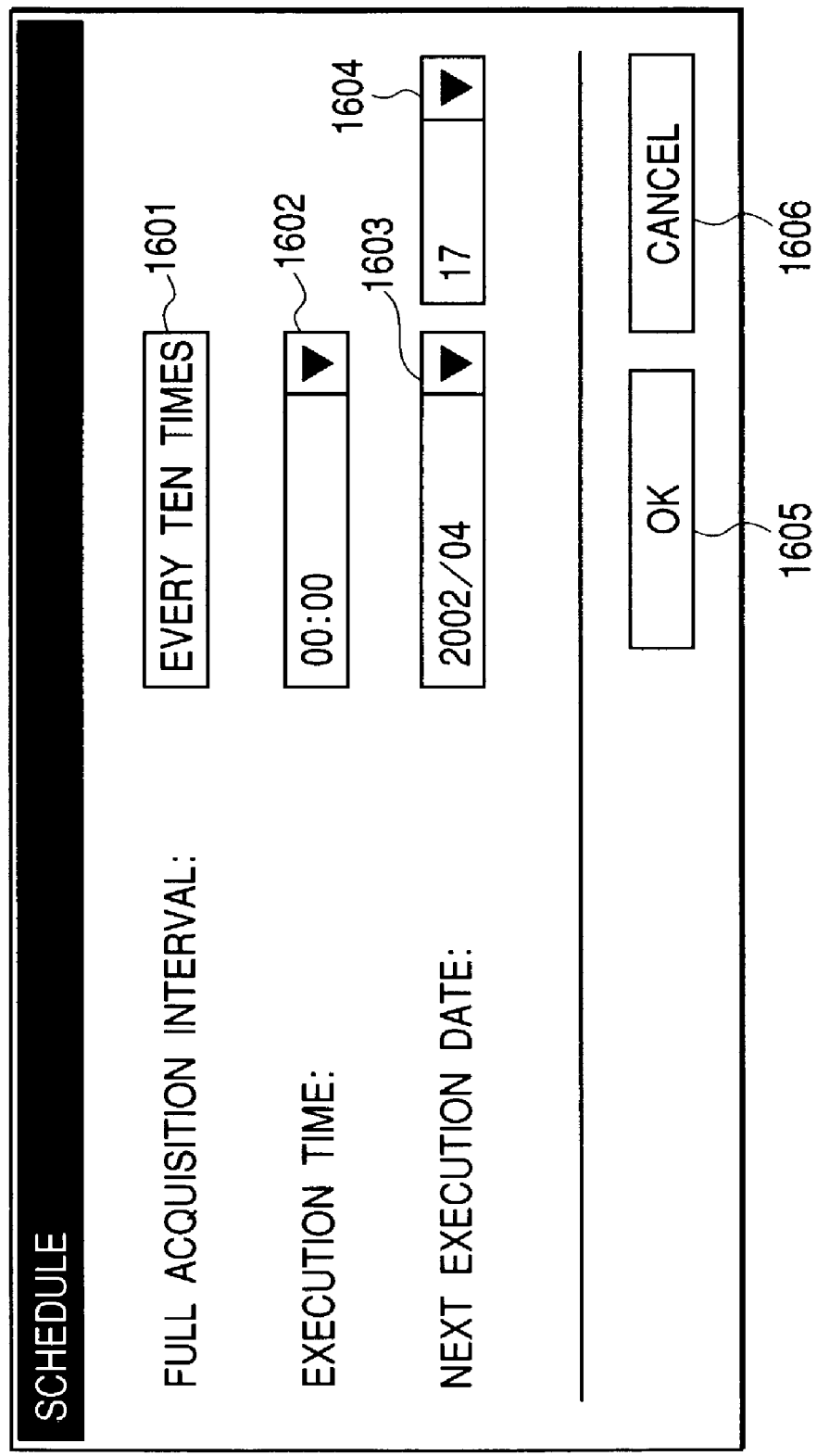
FIG. 16 is a drawing showing an example of a screen where a schedule is set so that an integrated server computer 1410 may acquire the historical print information of the base server computer 1400.

FIG. 16 is a drawing showing an example of a screen where a schedule is set so that the integrated server computer 1410 may acquire the historical print information of the base server computer 1400.

On this screen, it is assumed that the integrated server computer 1410 acquires the historical print information of the base server computer 1400 at a fixed time every day. In addition, if the processing of acquiring all the historical print information is performed at the same time when a lot of base server computers 1400 exist, a load to the integrated server computer 1410 becomes large. Hence, it is possible to perform settings different from each other for respective base server computers 1400.

On this screen, there is an interval input column 1601 for designating an interval of full acquisition of historical print information, a time input column 1602 for designating the execution time of processing of acquiring full or differential historical print information, a month input column 1603 and a day input column 1604 for designating date and time when the next full data acquisition will be performed, an OK button 1605 for finally establishing information inputted to those columns, and a cancel button 1606 for exiting from this diagram without finally establishing this information.

When it becomes the time inputted in the time input column 1602, the integrated server computer 1410 acquires historical print information by giving a request to the base server computer 1400. At this time, the integrated server computer 1410 usually acquires only the historical print information that is newly added to be increased, and acquires all the historical print information, which the base server computer 1400 has, in each interval inputted in the interval input column 1601. The former is called differential data update processing, and the latter is called full data acquisition processing.

In addition, in the full data acquisition processing, all the historical print information of an object base is acquired after all the historical print information that was acquired has been already deleted. On the other hand, in the differential data update processing, only the historical print information added in the base server computer after having been acquired last time is acquired. Hence, if a department, a user, a device, or the like is added in the base server computer after the full data acquisition processing, the additional one is determined as an unknown one in the difference data update processing.

Hence, the full data acquisition processing is performed so as to manage the added department, user, device, or the like. In addition, it is possible to avoid a mismatch of historical print information by performing the differential data update processing without fail after the full data acquisition processing.

A reason why a next execution date when the full data acquisition processing will be performed is specifiable in the month input column 1603 and day input column 1604 is to make it possible to distribute a load to the integrated server computer 1410 by shifting a day when historical print information is acquired if a lot of base server computers 1400 exist. In particular, in the full data acquisition processing, since there is a possibility that a large amount of historical print information is transferred, it is remarkably effective to make it possible to designate an execution date in each base server computer.

Figure 17:
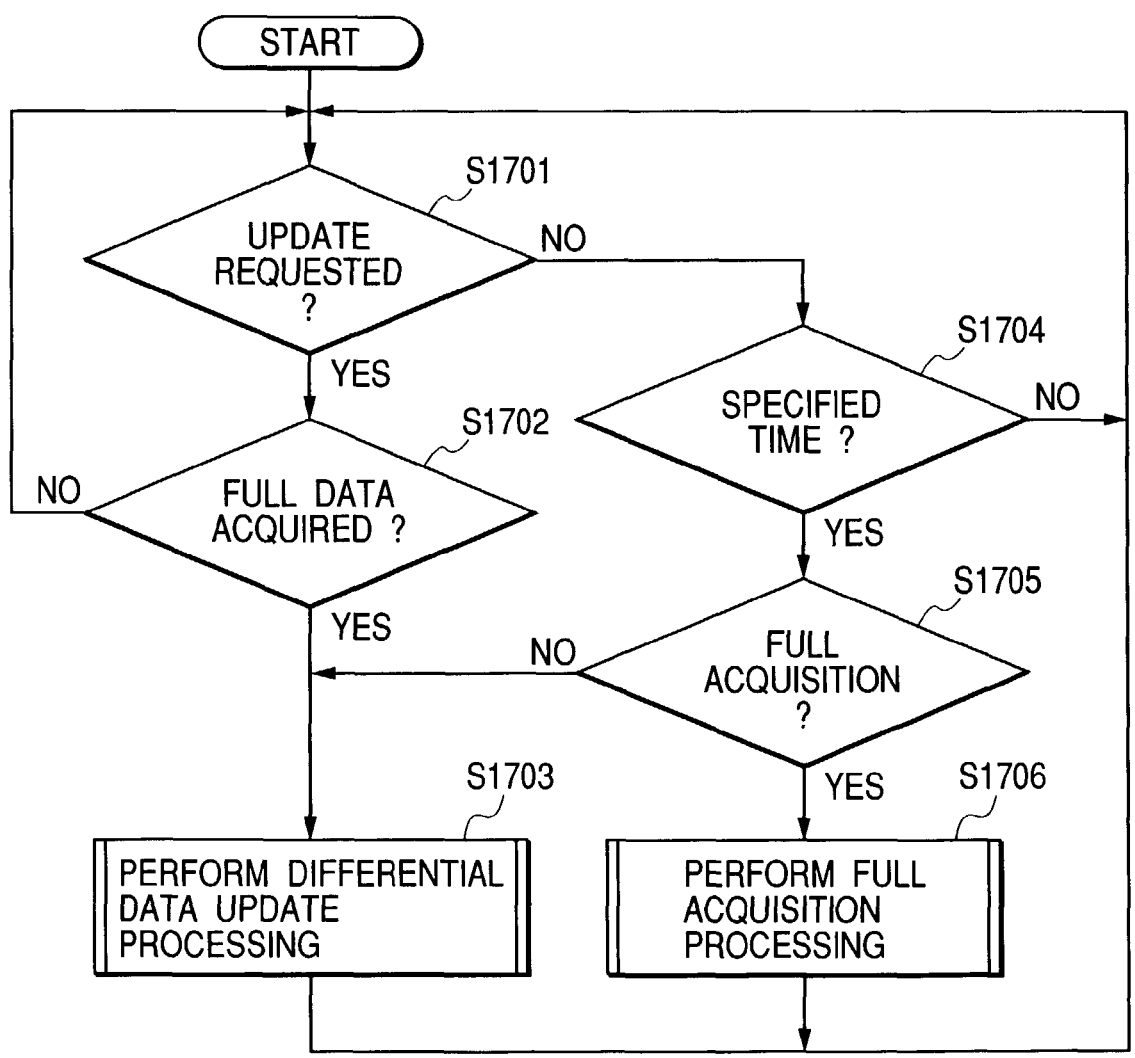
FIG. 17 is a flow chart showing a flow of processing at the time when the integrated server computer 1410 acquires the historical print information of the base server computer 1400.

FIG. 17 is a flow chart showing a flow of processing at the time when the integrated server computer 1410 acquires the historical print information of the base server computer 1400.

First of all, at step S1701, the integrated server computer 1410 determines whether a supervisor instructed an update request of the differential data of the base server computer 1400 in the job account integration server application 1071.

When instructed, it is determined whether the full data acquisition processing was performed before at step S1702. If not instructed, differential historical print information is acquired from the base server computer 1400 at step S1703. In addition, the processing at step S1703 is called differential data update processing.

The process returns to step S1701 when the full data acquisition was performed before.

When the update request of differential data was not instructed at step S1701, it is determined at step S1704 whether it is the time that the periodic update processing is designated.

The periodic update processing means the update processing of historical print information performed at the time set on the schedule setting screen in FIG. 16. The process returns to step S1701 if it is not the designated time. When it becomes the designated time, the integrated server computer 1410 confirms set contents, and confirms whether the full data acquisition processing is performed or the differential data update processing is performed.

When performing the differential data update processing, the integrated server computer 1410 acquires the differential historical print information from the base server computer 1400 at step S1703. When performing the full data acquisition processing, the integrated server computer 1410 acquires the full historical print information from the base server computer 1400 at step S1706.

Figure 18:
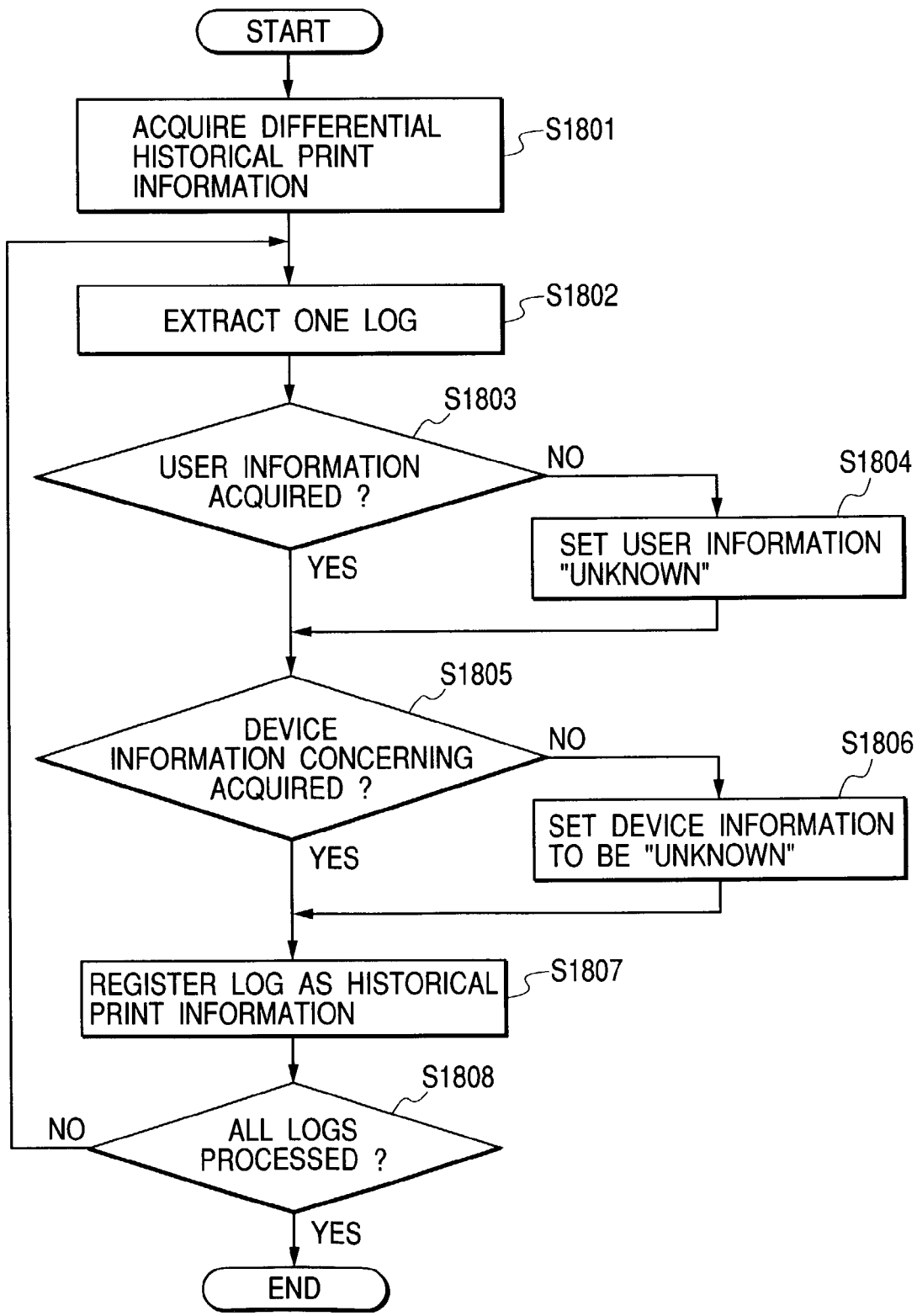
FIG. 18 is a flow chart showing the processing at step 1703 in FIG. 17.

FIG. 18 is a flow chart showing the processing at step 1703 in FIG. 17. Differential historical print information is acquired from the base server computer 1400 at step S1801. Then, one log is extracted from the acquired historical print information at step S1802. For example, the extracted log has the contents in FIG. 13.

Next, an item concerning a user (owner's name) in the extracted log is examined at step S1803, it is determined whether user information has already been acquired by the integrated server computer. The process moves to step S1805 when already registered. When not registered yet, it is determined that a user that the integrated server computer does not know is added, the process proceeds to step S1804, and the data of the item concerning the user (owner's name) in the extracted log is replaced with "unknown (unknown user)".

Subsequently, an item concerning a device (device name) in the extracted log is examined at step S1805, it is determined whether device information has already been acquired by the integrated server computer. The process moves to step S1807 when already registered. When not registered yet, it is determined that a device that the integrated server computer does not know is added, the process proceeds to step S1806, and the data of the item concerning the device (device name) in the extracted log is replaced with "unknown (unknown device)".

The log is registered in the memory storage 1417 as historical print information at step S1807. Then, it is determined at step S1808 whether the processing at steps S1802 to S1806 was performed for all logs, and the processing is ended when performed.

Though the items concerning a user and a device are confirmed in the above-described example, it is also possible to perform similar processing on items concerning paper type, card information, etc. besides them.

Usually, the information on a user and a device is registered in the base server computer to be reported from the base server computer to the integrated server computer, or is registered in the integrated server computer. Then, these types of information are collated with historical print information, and a number of printed sheets per user, a number of printed sheets per department where a user belongs, and a number of printed sheets per device are aggregated.

As for whether the information on a user or a device is registered, if the user or device that is not included in the historical print information acquired in the above-described data acquisition processing is included in the historical print information, acquired in the differential update data processing, when the differential data update processing is performed after the full data acquisition processing, it is possible to determine this as "unknown".

In addition, "unknown" may be one type in the integrated server computer, or it is also good to classify the "unknown" into "unknown in base A" every base.

Figure 19:
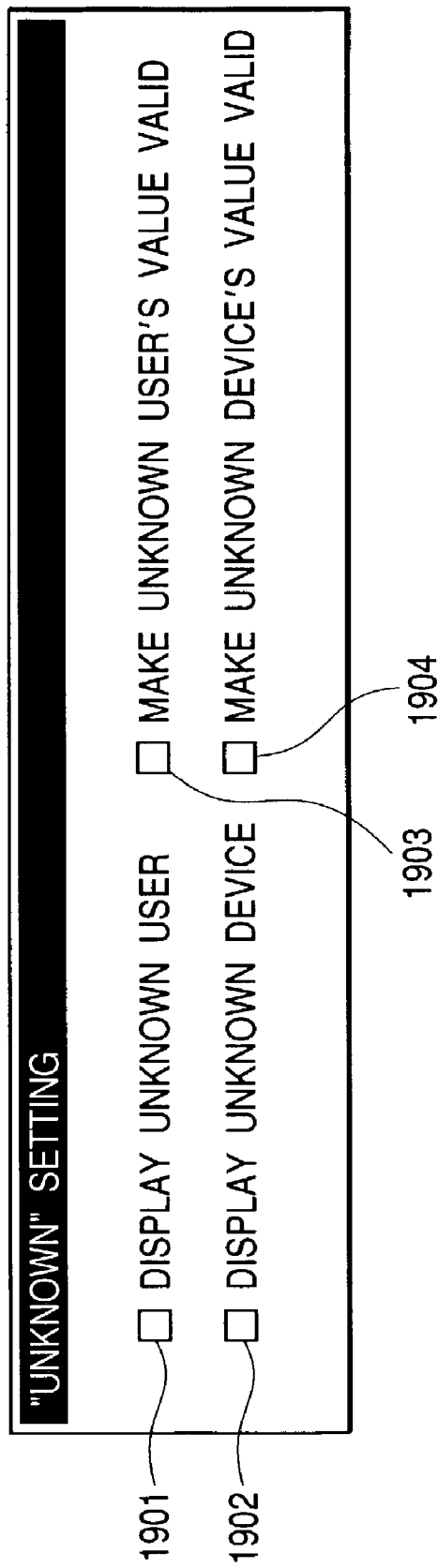
FIG. 19 is a screen shot showing a setting screen for performing the setting concerning the treatment of "unknown"

FIG. 19 is a screen showing a setting screen for performing the setting concerning the treatment of "unknown".

First of all, reference numeral 1901 is for setting whether an unknown user is displayed as "unknown". Reference numeral 1902 is for setting whether an unknown device is displayed as "unknown".

In addition, reference numeral 1903 is for setting whether the historical print information of an unknown user is made valid. Reference numeral 1904 is for setting whether the historical print information of an unknown device is made valid;

Besides these, it is also possible to set whether the historical print information of an unknown user and the like that is added in the above-described processing is included in the aggregation work that a supervisor performs.

Furthermore, it is also possible to grip a flow of job acquisition from every base by aggregating what is made unknown in each base.

Figure 20:
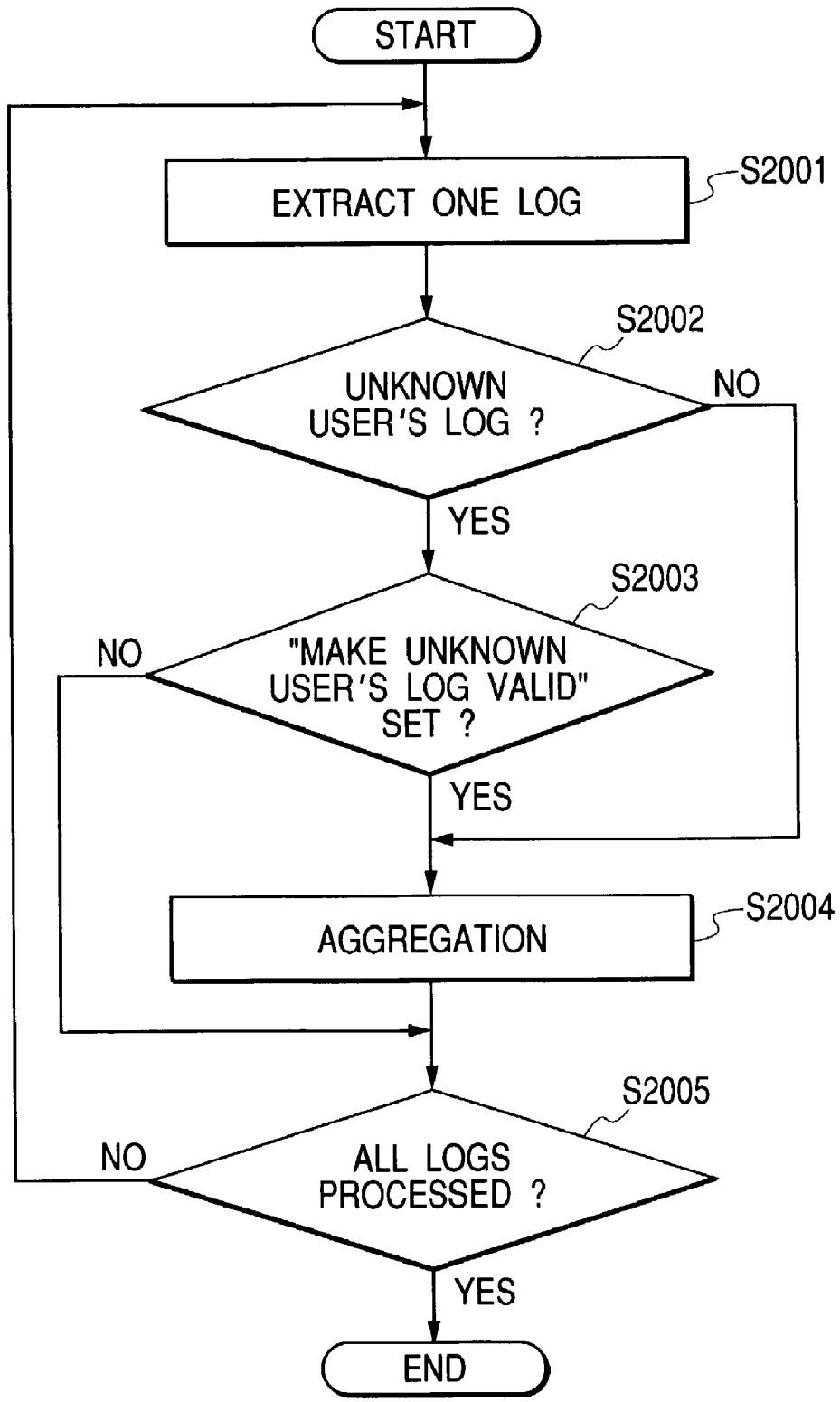
FIG. 20 is a flow chart showing the aggregate processing of performing aggregation.

FIG. 20 is a flow chart showing the aggregate processing of performing aggregation on the basis of these settings. When a supervisor executes aggregate processing by designating a desired aggregation condition, the following processing is performed.

First of all, one log that agrees with the aggregation condition is extracted at step S2001. Then, it is determined at step S2002 whether the extracted log is a log whose user is unknown.

When the log is a log whose user is not unknown, the process proceeds to step S2004, and aggregate processing is performed so as to reflect the contents of the log concerned in aggregation result.

In the case of the log whose user is unknown, it is determined at step S2003 on the basis of the contents of the setting in FIG. 19 whether "make unknown user's log valid" is designated. If not designated, the process proceeds to step S2005 so as not to reflect the log concerned in the aggregation result. If "make unknown user's log valid" is designated, the process proceeds to step S2004 so as to perform aggregation by including the log concerned.

Finally, it is confirmed at step S2005 whether processing has been performed for all logs, and the above-described steps are repeated until processing is fully performed.

Respective computers execute processing shown in flow charts shown in respective charts (FIGS. 15, 17, 18, 20, etc.) in this embodiment, and, respective units shown in FIGS. 1 and 14 on the basis of programs. Then, also in the case that an information group including a program is supplied by a storage medium such as a CD-ROM, a flash memory, or an FD, or from an external storage medium via a network to the client computer, the present invention can be applied.

As mentioned above, it is needless to say that an object of the present invention is achieved even if a computer (or, a CPU or an MPU) of a system or an apparatus reads and executes a program code that is stored in a storage medium by supplying a storage medium recording a program code of software, which achieves a function of the above-described embodiment, to a system or an apparatus, or by downloading the program code from an external server (not shown).

In this case, the program code itself of the job account server or job account client program, or the like that is read from the storage medium achieves a new function of the present invention, and the storage medium that stores the program code constitutes the present invention. As a storage medium for supplying the program code, it is possible to use, for example, a floppy disk, a hard disk, an optical disk, a magneto-optical disk, a DVD, a CD-ROM, a magnetic tape, a nonvolatile memory card, ROM, EEPROM, and the like.

In addition, it is needless to say that it includes the case that not only a function of the above-described embodiment is achieved by a computer executing the read program code, but also a function of the above-described embodiment is achieved by an OS (operating system) or the like running on a computer and performing part or all of actual processing on the basis of an instruction of the program code. Moreover, it is needless to say that it includes the case that a CPU or the like that is provided in a feature expansion board or a feature expansion unit performs part or all of actual processing on the basis of an instruction of the program code after a program code, which is transmitted from an external predetermined server apparatus (not shown) via a network or is read from a storage medium, is written in memory provided in a feature expansion board inserted into the computer or a feature expansion unit connected to the computer, and a function of the above-described embodiment is achieved.

According to the present invention, it is possible to collect the acquired job information efficiently and without increasing a load in a wide range or plural bases by controlling whether all job information, managed by the management apparatus concerned, is acquired from the management apparatus managing information on the data processing, performed by a device, as job information, or, acquiring additional job information from among the job information managed by the management apparatus concerned. In addition, since it is possible to acquire all job information managed by the management apparatus by having acquired the differential job information even if unknown information is included, it is possible to correct a mismatch when aggregation is performed on the basis of the job information.

Furthermore, the above-described differential acquisition means can collect job information collected in a wide range or plural bases efficiently and without increasing a load by acquiring additional job information after job information was acquired last time.

Moreover, it is possible to set the time of each management apparatus acquiring job information and to prevent processing loads and communication loads from concentrating temporarily because of the concentration of job information acquisition, by making a display unit display a screen for setting at least one of the time of acquiring all or additional job information, an interval of acquiring all job information, and the time of acquiring all job information.

According to the present invention, it is possible to flexibly manage job information without discarding information where a mismatch occurs by acquiring job information, managed by a management apparatus, from the concerned management apparatus managing information on the data processing, performed by a device, as job information, determining whether a value of an item that the acquired job information shows is new, and modifying a value of the above-described item to a value showing uncertainty when it is determined that it is new.

In addition, it is possible to flexibly correspond to information where a mismatch occurs without acquiring all the past information every time and to clarify a user, a device, or the like, which is newly added, as an unknown one, by determining that a value of an item that the job information that is acquired shows is new when the value of the item that the job information that is acquired shows when additional job information is acquired from among job information managed by a management apparatus is not included in values of the item that the job information that is acquired shows when all job information managed by the management apparatus is acquired.

Furthermore, it is possible to flexibly correspond to information where a mismatch occurs and to perform aggregation corresponding to a user's intention, by making the user set whether job information where a value of an item shows uncertainty is used when aggregation based on the job information that is managed is performed.

It is possible to flexibly correspond to information where a mismatch occurs and to perform information management corresponding to user's intention, by making the user set whether information showing uncertainty is displayed when aggregation based on the job information that is managed is performed and aggregation result is displayed.

What is claimed is:

1. A management system that includes a management apparatus acquiring print job history information on print processing performed by a plurality of printing devices, and an integrated management apparatus acquiring and managing print job history information managed by a plurality of management apparatuses, wherein the integrated management apparatus comprises:
    a processor; and
    a memory on which a computer program is stored that, when executed by the processor, causes the integrated management apparatus to perform the steps of:
    a full acquisition step that acquires all print job history information stored in and managed by a management apparatus, which is designated from among the plurality of management apparatuses, after deleting the already acquired print job history information from the designated management apparatus;
    a difference acquisition step that acquires a difference of the print job history information from the print job history information managed by the management apparatus, designated from among the plurality of management apparatuses, wherein the difference of the print job history information is print job history information concerning a plurality of print jobs newly stored after the acquisition by said full acquisition step or print jobs stored after a previous acquisition by said difference acquisition step;
    a designation step that designates a job information acquisition time of performing periodic acquisition of the print job history information stored in and managed by said management apparatus in said full acquisition step or said difference acquisition step, and frequency of acquisition of all the print job history information in said full acquisition step; and
    a report output step that outputs a use state report of a base server computer for each said management apparatus, by using the print job history information acquired in said full acquisition step or said difference acquisition step,
    wherein said full acquisition step or said difference acquisition step acquires the print job history information according to the designated frequency, in the job information acquisition time designated in said designation step.

2. An integrated management apparatus that communicates with a management apparatus acquiring print job history information on print processing, performed by a plurality of printing devices, and that acquires and manages print job history information managed by a plurality of management apparatuses, comprising:
    a processor; and
    a memory on which a computer program is stored that, when executed by the processor, causes the integrated management apparatus to perform the steps of:
    a full acquisition step that acquires all print job history information stored in and managed by a management apparatus which is designated from among the plurality of management apparatuses, after deleting the already acquired print job history information from the designated management apparatus;
    a difference acquisition step that acquires a difference of print job history information from the print job history information managed by the management apparatus, designated from among the plurality of management apparatuses, wherein the difference of the print job history information is print job history information concerning a plurality of print jobs newly stored after the acquisition by said full acquisition step or print jobs stored after a previous acquisition by said difference acquisition step;
    a designation step that designates a job information acquisition time of performing periodic acquisition of the print job history information stored in and managed by said management apparatus in said full acquisition step or said difference acquisition step, and frequency of acquisition of all the print job history information in said full acquisition step; and
    a report output step that outputs a use state report of a base server computer for each said management apparatus, by using the print job history information acquired in said full acquisition step or said difference acquisition step,
    wherein said full acquisition step or said difference acquisition step acquires the print job history information according to the designated frequency, in the job information acquisition time designated in said designation step.

3. A management method implemented in an integrated management apparatus that communicates with a management apparatus acquiring print job history information on print processing, performed by a plurality of printing devices, and acquiring and managing print job history information managed by a plurality of management apparatuses, comprising:
    a full acquisition step of acquiring all print job history information, stored in and managed by a management apparatus which is designated from among the plurality of management apparatuses, after deleting the already acquired print job history information from the designated management apparatus;

a difference acquisition step of acquiring a difference of print job history information from the print job history information managed by the management apparatus, designated from among the plurality of management apparatuses, wherein the difference of the print job history information is print job history information concerning a plurality of print jobs newly stored after the acquisition in said full acquisition step or print jobs stored after a previous acquisition in said difference acquisition step;

a designation step of designating a job information acquisition time of performing periodic acquisition of the print job history information stored in and managed by said management apparatus in said full acquisition step or said difference acquisition step, and frequency of acquisition of all the print job history information in said full acquisition step; and a report output step that outputs a use state report of a base server computer for each said management apparatus, by using the print job history information acquired in said full acquisition step or said difference acquisition step, wherein said full acquisition step or said difference acquisition step acquires the print job history information according to the designated frequency, in the job information acquisition time designated in said designation step.

4. The management method according to claim 3, wherein the difference acquisition step acquires print job history information that is added after print job history information was acquired last time.

5. The management method according to claim 3, wherein the management method makes a display unit display a screen for setting at least one of a time for acquiring print job history information by said full acquisition step or said difference acquisition step, an interval of acquiring print job history information in said full acquisition step, and time of acquiring all print job history information in said full acquisition step.

6. The management method according to claim 3, wherein the print processing is printing processing based on print data transmitted from an information processing apparatus; and wherein the print job history information includes at least one of job identification information for identifying print processing, information showing an application program that creates print data, information showing a number of logical pages of print data, information showing a document name of print data, information showing a start time of print processing, information showing a finish time of print processing, information showing paper size, information showing a number of printed physical pages, information showing whether duplex printing was performed, information showing a name of a user having requested print processing, information showing a number of delivery pages, information showing a number of delivery sheets, and information showing a printing device having performed print processing.

7. The management method according to claim 3, wherein the printing device is at least one of a printer, a copier, a compound machine, or a facsimile.

8. A non-transitory computer-readable storage medium that stores a control program to be executed by an integrated management apparatus that communicates with a management apparatus acquiring print job history information on print processing, performed by a plurality of printing devices, and acquiring and managing print job history information managed by a plurality of management apparatuses, wherein the control program makes the integrated management apparatus execute:

a full acquisition step of acquiring all the print job history information stored in and managed by a management apparatus which is designated from among the plurality of management apparatuses, after deleting the already acquired print job history information from the designated management apparatus;

a difference acquisition step of acquiring a difference of print job history information from the print job history information, managed by the management apparatus, designated from among the plurality of management apparatuses, wherein the difference of the print job history information is print job history information concerning a plurality of print jobs newly stored after the acquisition in said full acquisition step or print jobs stored after a previous acquisition in said difference acquisition step;

a designation step of designating a job information acquisition time of performing periodic acquisition of the print job history information stored in and managed by said management apparatus in said full acquisition step or said difference acquisition step, and frequency of acquisition of all the print job history information in said full acquisition step; and a report output step that outputs a use state report of a base server computer for each said management apparatus, by using the print job history information acquired in said full acquisition step or said difference acquisition step, wherein said full acquisition step or said difference acquisition step acquires the print job history information according to the designated frequency, in the job information acquisition time designated in said designation step.

* * * * *